US010118164B2

(12) United States Patent
Tissler et al.

(10) Patent No.: US 10,118,164 B2
(45) Date of Patent: Nov. 6, 2018

(54) PLATINUM/PALLADIUM ZEOLITE CATALYST

(71) Applicant: CLARIANT PRODUKTE (DEUTSCHLAND) GMBH, Frankfurt am Main (DE)

(72) Inventors: Arno Tissler, Tegernheim (DE); Mika Endler, Rosenheim (DE); Patrick Mueller, Prien am Chiemsee (DE); Grigory Reznikov, Bruckmuehl (DE); Florian Weilermann, Munich (DE); Margit Schuschke, Bruckmuehl (DE); Andane Stein, Bad Aibling (DE); Frank Klose, Rosenheim (DE)

(73) Assignee: CLARIANT PRODUKTE (DEUTSCHLAND) GMBH, Frankfurt am Main (DE)

(*) Notice: Subject to any disclaimer, the term of this patent is extended or adjusted under 35 U.S.C. 154(b) by 0 days.

(21) Appl. No.: 14/378,913

(22) PCT Filed: Feb. 18, 2013

(86) PCT No.: PCT/EP2013/053185
§ 371 (c)(1),
(2) Date: Aug. 14, 2014

(87) PCT Pub. No.: WO2013/121041
PCT Pub. Date: Aug. 22, 2013

(65) Prior Publication Data
US 2016/0059226 A1 Mar. 3, 2016

(30) Foreign Application Priority Data
Feb. 17, 2012 (DE) ........................ 10 2012 003 032

(51) Int. Cl.
*B01J 29/06* (2006.01)
*B01J 29/74* (2006.01)
*B01J 37/08* (2006.01)
*B01J 29/068* (2006.01)
*B01J 35/00* (2006.01)
*B01J 35/10* (2006.01)
*B01J 37/02* (2006.01)
*B01D 53/86* (2006.01)

(52) U.S. Cl.
CPC ......... *B01J 29/7415* (2013.01); *B01J 29/068* (2013.01); *B01J 35/002* (2013.01); *B01J 35/006* (2013.01); *B01J 35/0073* (2013.01); *B01J 35/1019* (2013.01); *B01J 37/0201* (2013.01); *B01J 37/0215* (2013.01); *B01J 37/0236* (2013.01); *B01J 37/08* (2013.01); *B01D 53/864* (2013.01); *B01D 2255/1021* (2013.01); *B01D 2255/1023* (2013.01); *B01D 2255/502* (2013.01); *B01D 2257/502* (2013.01); *B01D 2257/7022* (2013.01)

(58) Field of Classification Search
USPC ......... 502/60, 74, 63, 64, 66, 69, 71, 77, 85
See application file for complete search history.

(56) References Cited

U.S. PATENT DOCUMENTS

| | | | |
|---|---|---|---|
| 3,010,833 A | 11/1961 | Cataldo | |
| 3,389,100 A | 6/1968 | Cook | |
| 4,310,356 A | 1/1982 | Trubiano et al. | |
| 4,683,214 A | 7/1987 | Angevine et al. | |
| 5,618,338 A | 4/1997 | Kurabayashi et al. | |
| 7,459,412 B2 | 12/2008 | Lercher et al. | |
| 8,420,035 B2* | 4/2013 | Maletz ................. | B01D 53/944 106/1.25 |
| 8,609,570 B2* | 12/2013 | Schwarzer ........... | B01D 53/944 502/104 |
| 8,685,876 B2 | 4/2014 | Schwarzer et al. | |
| 9,221,038 B2 | 12/2015 | Wanninger et al. | |
| 2002/0016440 A1 | 2/2002 | Louwet et al. | |
| 2008/0035525 A1 | 2/2008 | Burgfels et al. | |
| 2008/0227627 A1* | 9/2008 | Strehlau ............... | B01D 53/944 502/61 |
| 2011/0044871 A1* | 2/2011 | Maletz ................. | B01D 53/944 423/213.5 |
| 2011/0305612 A1* | 12/2011 | Muller-Stach ....... | B01D 53/945 423/212 |
| 2012/0028788 A1* | 2/2012 | Manoylova .......... | B01D 53/944 502/1 |

FOREIGN PATENT DOCUMENTS

| | | |
|---|---|---|
| DE | 10 2009 053 919 | 5/2011 |
| DE | 10 2009 053951 | 5/2011 |
| DE | 10 2009 053 944 | 9/2011 |
| DE | 10 2011121971 | 7/2013 |
| EP | 0 003 818 | 9/1979 |
| EP | 2 322 473 | 5/2011 |

(Continued)

OTHER PUBLICATIONS

PCT International Search Report for PCT/EP2013/053185, dated Apr. 22, 2013.
English Translation of PCT international Preliminary Report on Patentability for PCT/EP2013/053185, dated Aug. 19, 2014.
D.S. Coombs et al., "Recommended Nomenclature Far Zeolite Minerals: Report of the Subcommittee on Zeolites of the international Mineralogical Association, Commission on New Minerals and Mineral Names". The Canadian Mineralogist vol. 35, pp. 1571-1606, 1997.

(Continued)

*Primary Examiner* — Elizabeth D Wood
(74) *Attorney, Agent, or Firm* — Anthony A. Bisulca

(57) ABSTRACT

The invention relates to a method for producing a bimetallic catalyst containing palladium and platinum on a zeolitic carrier material, to a bimetallic catalyst that can be obtained by means of the method, and to the use of the catalyst in oxidation catalysis.

19 Claims, 9 Drawing Sheets

(56) References Cited

FOREIGN PATENT DOCUMENTS

| EP | 2 545 982 | | 1/2013 |
|----|-----------|---|--------|
| WO | 2009/068289 | * | 6/2009 |
| WO | 2009/138204 | * | 11/2009 |
| WO | 2010/112431 | * | 10/2010 |
| WO | WO 2011/060917 | | 5/2011 |
| WO | WO 2013/092707 | | 6/2013 |

OTHER PUBLICATIONS

DE 10 2009 053 919, English Abstract, May 26, 2011.
DE 10 2009 053 944, English Abstract, Sep. 15, 2011.
EP 2 545 982, English Abstract, Jan. 16, 2013.
Intellectual Property India Examination Report for 1659/KOLNP/2014, dated Jan. 11, 2018.

* cited by examiner

PLATINUM/PALLADIUM ZEOLITE CATALYST

The present invention relates to a method for producing a bimetallic catalyst comprising palladium and platinum on a zeolitic support material, to a bimetallic catalyst obtainable by the method, and also to the use of the catalyst in oxidation catalysis.

Supported precious metal catalysts in which relatively small precious metal particles are deposited on the surface of a solid support are used in particular in synthesis-chemical and petrochemical processes to convert a very wide variety of starting materials into desired intermediates or end products and/or to chemically refine various cuts of petroleum processing. Moreover, supported precious metal catalysts are used in particular also as oxidation catalysts in exit-air purification for the oxidation of mostly organic compounds.

Supported catalysts laden with precious metal are generally produced by means of a multistage method. In this, for example in a first step, a support material is impregnated with a precious metal salt solution of the desired precious metal. After removing the solvent from the support material in a subsequent step, the support material is then calcined in a further step, during which the precious metal can be converted to a metallic or oxidic form—often mixed phases of the two—as a result of the thermal treatment. In many cases, the oxide form is already the catalytically active species, meaning that the catalyst can be used in this form. It is moreover possible to convert the oxidic precious metal species in a further step, for example by means of hydrogen, carbon monoxide or wet-chemical reducing agent, into the highly disperse precious metal of oxidation state 0, which can likewise act as catalytically active species.

The activity of supported precious metal catalysts is generally dependent on the size of the precious metal (oxide) particles. The supported precious metal catalysts known in the prior art have the disadvantage that they lose activity in the course of being used on account of a sintering of the precious metal (oxide) particles to give larger units and an associated reduction in catalytically active surface area. In this connection, the rate of the so-called thermal aging process is dependent on the temperature level at which the catalyst is used. In fact, as the use temperature rises, the rate of said aging process increases, the cause of which is presumably an increased mobility of the precious metal (oxide) particles on the support material surface and an associated increased sintering tendency.

In the prior art, attempts have already made to produce precious metal catalysts which, in high temperature applications, have a high activity and an only slight thermal aging process.

DE 10 2009 053 919 and DE 10 2009 053 944 disclose catalysts in which the precious metal is located as a matter of priority in the pores of zeolites. This results in a very high activity and aging stability of the catalyst. A disadvantage is the need for high calcination temperatures of more than 700° C. for decomposing the sulfite precursor compounds used. A further disadvantage of these catalysts is moreover the low sulfur tolerance, which is further reduced by using the sulfite precursor compounds. Moreover, the in particular platinum-containing catalysts known in the prior art exhibit too low an activity as regards the oxidation of alkanes.

The object of the present invention was therefore to provide a catalyst which, in oxidation reactions, in particular in the oxidation of alkanes, has a high activity as well as a high aging and sulfur resistance.

The object was achieved by a method for producing a bimetallic catalyst comprising the steps:
 a) impregnation of a zeolitic support material with sulfur-free Pt and Pd precursor compounds,
 b) drying of the impregnated zeolitic support material in air,
 c) calcination of the impregnated and dried zeolitic support material under protective gas.

Surprisingly, it has been found that, compared to the catalysts known in the prior art, bimetallic Pt/Pd zeolite catalysts can be produced by means of the modified production method which, during the oxidation reaction, in particular during the reaction of alkanes, have an activity that is twice as high compared to conventional catalyst systems (based on the palladium content), without a deterioration in the aging and sulfur resistance arising.

Within the context of this invention, protective gases are gases or gas mixtures which are used as inert protecting atmosphere and are used for avoiding undesired chemical reactions, for example in order to keep oxygen away from sensitive substances. The protective gases used are preferably noble gases, e.g. argon, helium, neon or nitrogen.

According to one embodiment of the method according to the invention, the impregnation of the zeolitic support material with Pt and Pd precursor compounds takes place by impregnating the zeolite material with a solution which comprises both the Pt as well as the Pd precursor compound. This ensures that the surface of the zeolite material is covered largely uniformly with Pt and Pd precursor compounds. The essentially uniform coating of the zeolite material with the Pt and Pd precursor compounds forms the basis for the fact that in the subsequent calcination step, which leads to the decomposition of the Pt and Pd precursor compounds, and/or during conversion of the metal compound to the corresponding metal or to the metal oxide, the zeolite material is laden largely uniformly with the Pt and Pd particles.

The impregnation of the zeolitic support material can be carried out using all of the methods known to the person skilled in the art. Particularly preferably, the impregnation of the zeolite material takes place according to the "incipient wetness" method known to the person skilled in the art. The Pt and Pd precursor compound used can be for example nitrates, acetates, oxalates, tartrates, formates, amines, sulfides, carbonates, halides or hydroxides of the corresponding precious metals, with nitrates being preferred. The precursor compounds here should be essentially sulfur-free. In the context of the invention, it may also be preferred that the Pt and the Pd precursor compounds have the same anion, for example nitrate.

The drying of the impregnated zeolitic support material preferably takes place below the decomposition point of the Pt and Pd precursor compound. The drying preferably takes place in air. Drying temperatures are mostly in the range from 50 to 150° C., preferably 80 to 120° C.

After the drying, a calcination step takes place. The calcination takes place preferably at temperatures of 300 to 600° C., more preferably at 400 to 550° C. The calcination time is preferably 1 to 8 h, more preferably 2 to 6 h and in particular about 3-5 h.

According to a further embodiment of the process, the method comprises the further steps:
 d) production of a washcoat from the impregnated and calcined zeolitic support material,
 e) coating of a support body with the washcoat,
 f) drying and calcination of the coated support body in air.

In the method according to the invention, the support material used for the impregnation steps is a zeolitic support material or a zeolite material. These two terms are used synonymously in the context of the invention.

In the context of the present invention, a zeolite material is understood according to a definition of the International Mineralogical Association (D. S. Coombs et al., Can. Mineralogist, 35, 1997, 1571) as meaning a crystalline substance with a structure characterized by a backbone made of tetrahedra joined together. Here, each tetrahedron consists of four oxygen atoms which surround a central atom, with the backbone containing open cavities in the form of channels and cages which are normally occupied by water molecules and extra backbone cations, which can be exchanged. The channels of the material are large enough here to permit access to guest compounds. In the hydrated materials, the dehydration takes place at least at temperatures below about 400° C. and is for the most part reversible.

According to one embodiment of the method according to the invention, it is provided that the aforementioned zeolite material is preferably a microporous or a mesoporous zeolite material. Here, the terms "microporous zeolite material" and "mesoporous zeolite material" should be understood according to the division of porous solids according to IUPAC (International Union of Pure and Applied Chemistry) as meaning zeolite materials whose pores have a diameter of less than 2 nm or a diameter of 2 nm to 50 nm.

The zeolite material to be used in the method according to the invention can preferably correspond to one of the structure types below: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG and ZON, with zeolite materials having a 12-ring pore system (BEA, FAU) and of the structure type beta (BEA) being particularly preferred. The above three-letter code nomenclature corresponds here to the "IUPAC Commission of Zeolite Nomenclature".

According to the invention, preference is likewise given to the members of mesoporous zeolite materials of the family which are summarized in the literature under the name "MCM", this name not being a specific structure type (cf. http://www.iza-structure.org/databases). According to the invention, particular preference is given to mesoporous silicates which are referred to as MCM-41 or MCM-48. MCM-48 has a 3D structure of mesopores, as a result of which the catalytically active metal in the pores is particularly readily accessible. MCM-41 is very particularly preferred and has an hexagonal arrangement of mesopores with uniform size. The MCM-41 zeolite material has an $SiO_2/Al_2O_3$ molar ratio of preferably greater than 100, more preferably of greater than 200 and most preferably of greater than 300. Further preferred mesoporous zeolite materials which can be used in the context of the present invention are those which are referred to in the literature as MCM-1, MCM-2, MCM-3, MCM-4, MCM-5, MCM-9, MCM-10, MCM-14, MCM-22, MCM-35, MCM-37, MCM-49, MCM-58, MCM-61, MCM-65 or MCM-68.

Which zeolitic support material or zeolite material is to be used in the method according to the invention depends in the first instance on the intended use of the catalyst to be produced by means of the method according to the invention. A large number of methods is known in the prior art for tailoring the properties of zeolite materials, such as for example the structure type, the pore diameter, the channel diameter, the chemical composition, the ion exchangeability and also activation properties, to a corresponding intended application.

The zeolite material to be used in the method according to the invention can be for example a silicate, an aluminum silicate, an aluminum phosphate, a silicon aluminum phosphate, a metal aluminum phosphate, a metal aluminum phosphosilicate, a gallium aluminum silicate, a gallium silicate, a boroaluminum silicate, a borosilicate, a titanium silicate, a titano-aluminum phosphate (TAPO) or a titano-silicon aluminum phosphate (TAPSO), with aluminum silicates and titanium silicates being particularly preferred.

According to the definition of the International Mineralogical Association (D. S. Coombs et al., Can. Mineralogist, 35, 1997, 1571), the term "aluminum silicate" is understood as meaning a crystalline substance with three-dimensional network structure of the general formula $M^{n+}[(AlO_2)_x(SiO_2)_y]xH_2O$, which is composed of $SiO_{4/2}$ and $AlO_{4/2}$ tetrahedra which are joined by common oxygen atoms to give a regular three-dimensional network. The atomic ratio of Si/Al=y/x is always greater than/equal to 1 according to the so-called "Löwenstein rule", which precludes the adjacent occurrence of two adjacent negatively charged $AlO_{4/2}$ tetrahedra. Although there are more exchange places available for metals in the case of a low Si/Al atomic ratio, the zeolite becomes increasingly hydrophilic and thermally unstable.

In the context of the present invention, the aforementioned zeolite materials can be used either in the alkali metal form, for example in the Na and/or K form, or in the alkaline earth metal form, ammonium form or in the H form in the process. Moreover, it is also possible to use the zeolite material in a mixed form, for example in an alkali metal/alkaline earth metal mixed form.

The invention further provides a catalyst which has been produced by the method according to the invention, wherein the catalyst comprises a bimetallic catalytically active composition comprising Pt and Pd on a zeolitic support material.

Preferably, the bimetallic catalytically active composition, i.e. the zeolitic material laden with precious metal, has a BET surface area of more than 400 $m^2/g$.

The bimetallic catalytically active composition preferably has a Pt content of 0.2 to 1.5% by weight, based on the catalytically active composition.

Furthermore, the bimetallic catalytically active composition preferably has a Pd content of 0.8 to 4.0% by weight, based on the catalytically active composition.

The catalytically active composition can preferably be processed with a preferably silicatic binder to give a washcoat and be applied as washcoat coating to a support body. The mass ratio of binder/catalytically active composition here is 0.05-0.5, preferably 0.1-0.3 and particularly preferably 0.15-0.25, based in each case on the solids fractions of binder and catalytically active composition.

The catalytically active composition can likewise be in the form of an unsupported catalyst, for example as extrudate of a zeolite coated with precious metal.

The catalyst in the form of a coating catalyst or of an unsupported catalyst moreover has 0.5 to 3.0% by weight of Pt, preferably 0.15 to 1.45% by weight of Pt, and also 1 to 5% by weight of Pt, preferably 0.6 to 3.8% by weight of Pd, based on the solids fraction of the unsupported catalyst or of the coated washcoat.

The Pd/Pt weight ratio in the bimetallic catalytically active composition or in the washcoat coating is preferably in the range from 6:1 to 1:1 and particularly preferably about 4:1 to 2:1.

Here, the Pt and Pd is located essentially in the pores of the zeolitic support material.

Pt and Pd are present here preferably in aggregates of <5 nm.

The precious metal aggregate size/cluster size is essentially determined by the size of the pore intersections. In the case of the BEA zeolite with a three-dimensional system of pores of max. 7.7 angstrom (0.77 nm), the diameter of a pore intersection is about 12 angstrom, i.e. 1.2 nm. This corresponds to a cluster size of about 100 atoms.

Moreover, the invention provides the use of the above-described catalyst as oxidation catalyst, in particular as catalyst for the oxidation of alkanes, for example ethane, methane, propane etc., but also of olefins and solvent vapors.

The invention is now illustrated in more detail by reference to examples, although these should not be considered to have a limiting effect on the scope of protection. Here, reference is additionally made to the figures.

EXAMPLE 1

The catalysts according to the invention were produced in a 2-step process. In a first step, a BEA150 zeolite was supplied with a solution of platinum nitrate and palladium nitrate by means of "incipient wetness" technology. The supplied zeolite was then dried for 16 h under air at 90° C. and then calcined under argon for 5 h at 550° C.

COMPARATIVE EXAMPLE 1

As comparative example 1, a BEA150 zeolite was supplied in an analogous manner with platinum nitrate and palladium nitrate by means of "incipient wetness" technology, dried at 90° C. and then calcined under air for 5 h at 550° C.

Table 1 summarizes the properties of the zeolite samples (formulation according to the invention and comparative example 1) produced in the course of the investigation.

EXAMPLE 2

Production of a Washcoat

In a second step, the calcined PtPd zeolite according to the invention and also that of comparative example 1 were processed with Bindzil (binder material) and water to give a washcoat and this washcoat was then coated onto corderite honeycombs. The coated corderite honeycombs were blown out with compressed air, then dried overnight at 150° C. under air and finally calcined for 3 h at 550° C.

TABLE 1

| PtPd-BEA150 zeolites (step 1) | | |
| --- | --- | --- |
| Batch PtPd-BEA150 | Formulation according to the invention, calcination under argon | Comparative formulation 1, calcination under air |
| Pt [% by weight] | 0.69 | 0.78 |
| Pd [% by weight] | 2.1 | 2.3 |
| BET surface area [$m^2/g$] | 601 | 585 |

Figure 1:
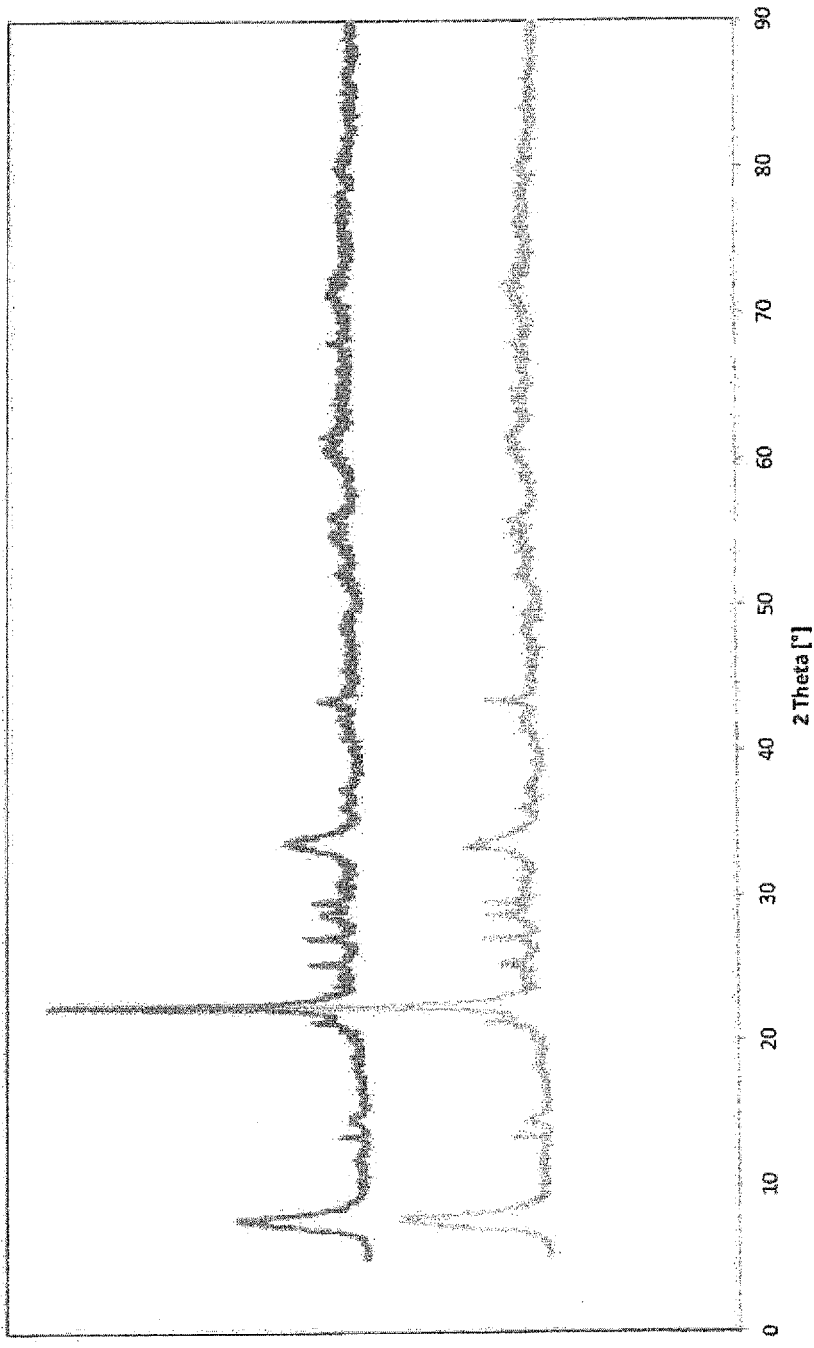
FIG. 1: shows the XRD spectrum of a PtPd-BEA150 zeolite produced according to the invention (bottom) and also of comparative example 1 (top)

FIG. 1 shows the XRD spectrum of a PtPD-BEA150 zeolite according to the invention produced according to the above procedure, as well as that of the comparison formulation. In both samples, no reflections for metallic Pt and Pd are present. The signals for precious metal oxides are also barely detectable. All large reflections contain virtually exclusively signal fractions of the BEA150 zeolite. It can be concluded from this that both Pt and also Pd are present in highly disperse form favorable for the performance. The absence of precious metal agglomerates >5 nm is thus clearly demonstrated.

Figure 2:
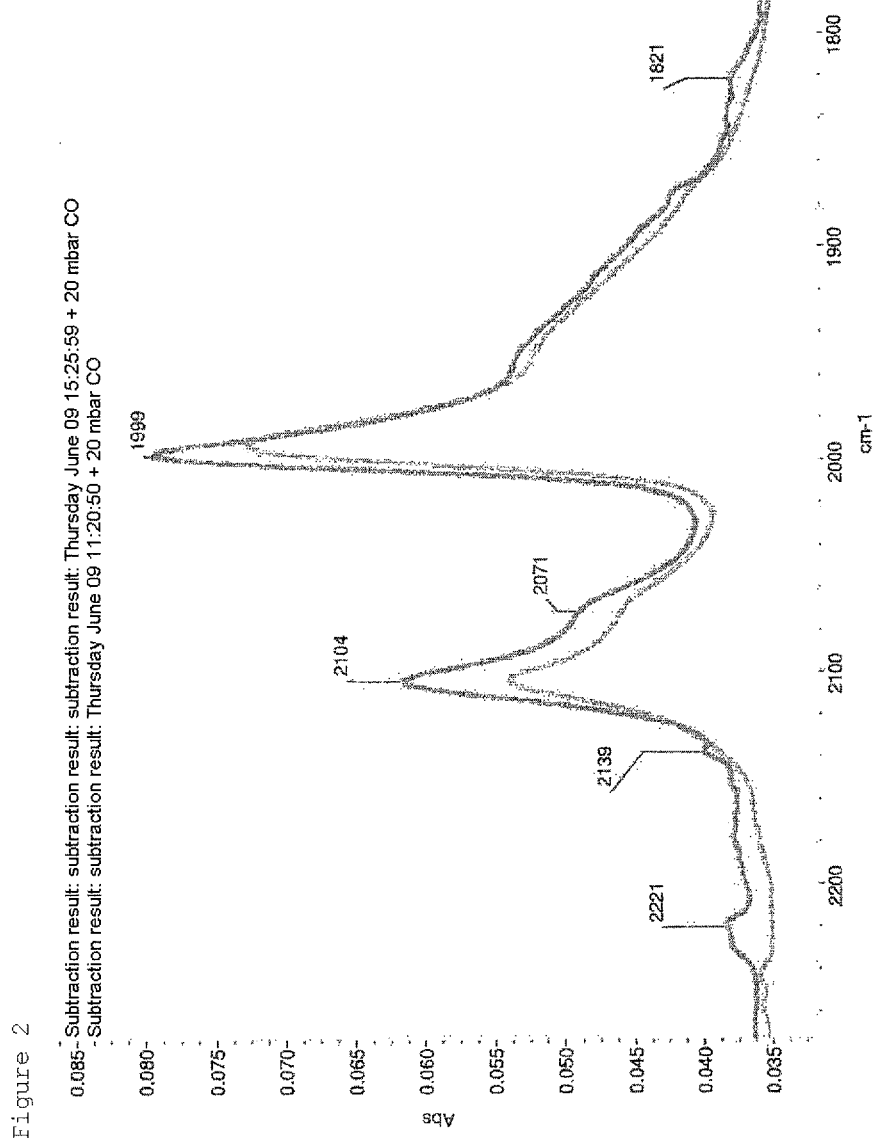
FIGS. 2 and 3: show IR spectra of the PtPd-BEA150 zeolite according to the invention, and also of comparative example 1 following CO chemisorption with and without metered addition of adamantanecarbonitrile.
Figure 3:
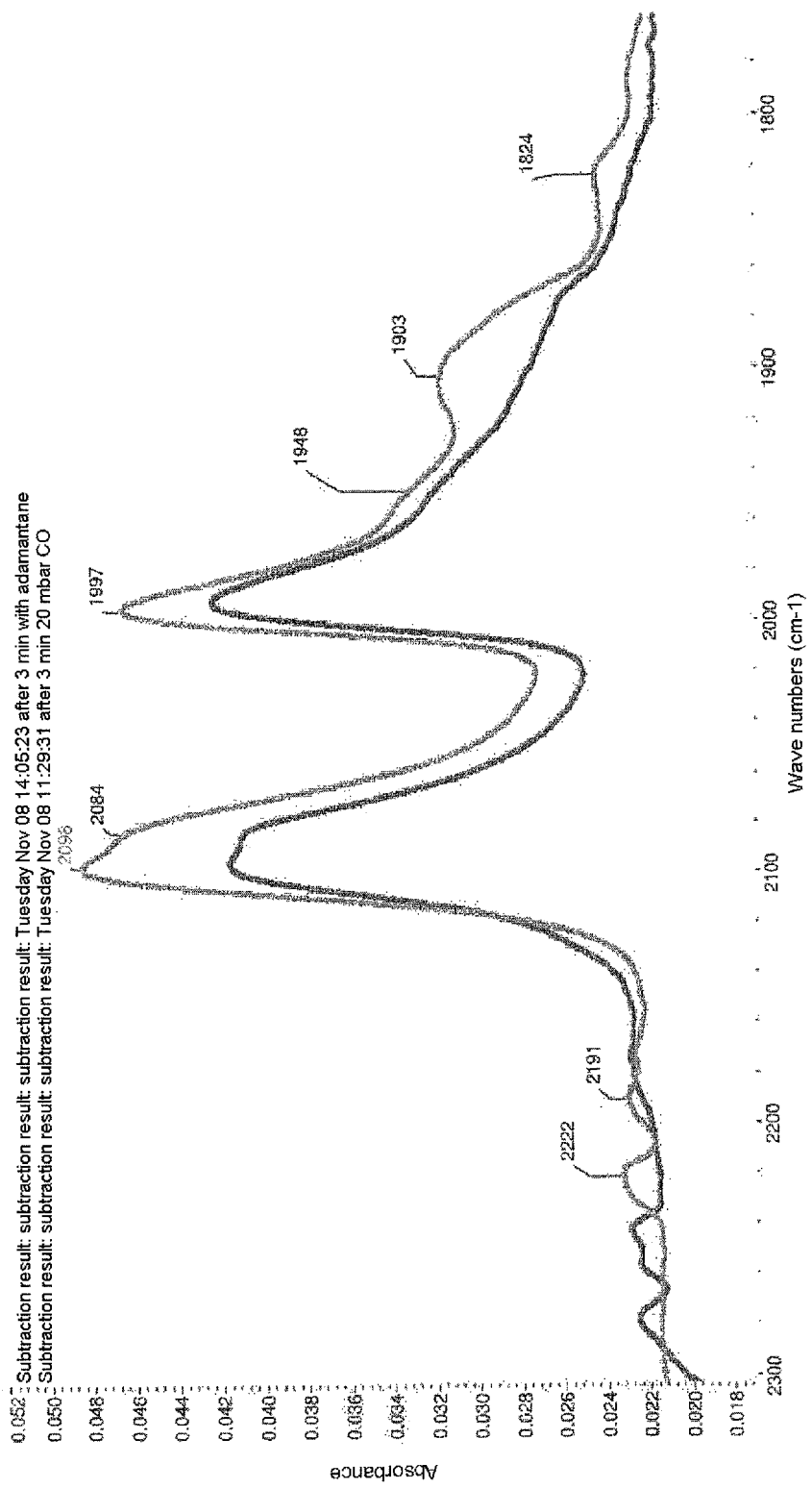
Figure 4A:
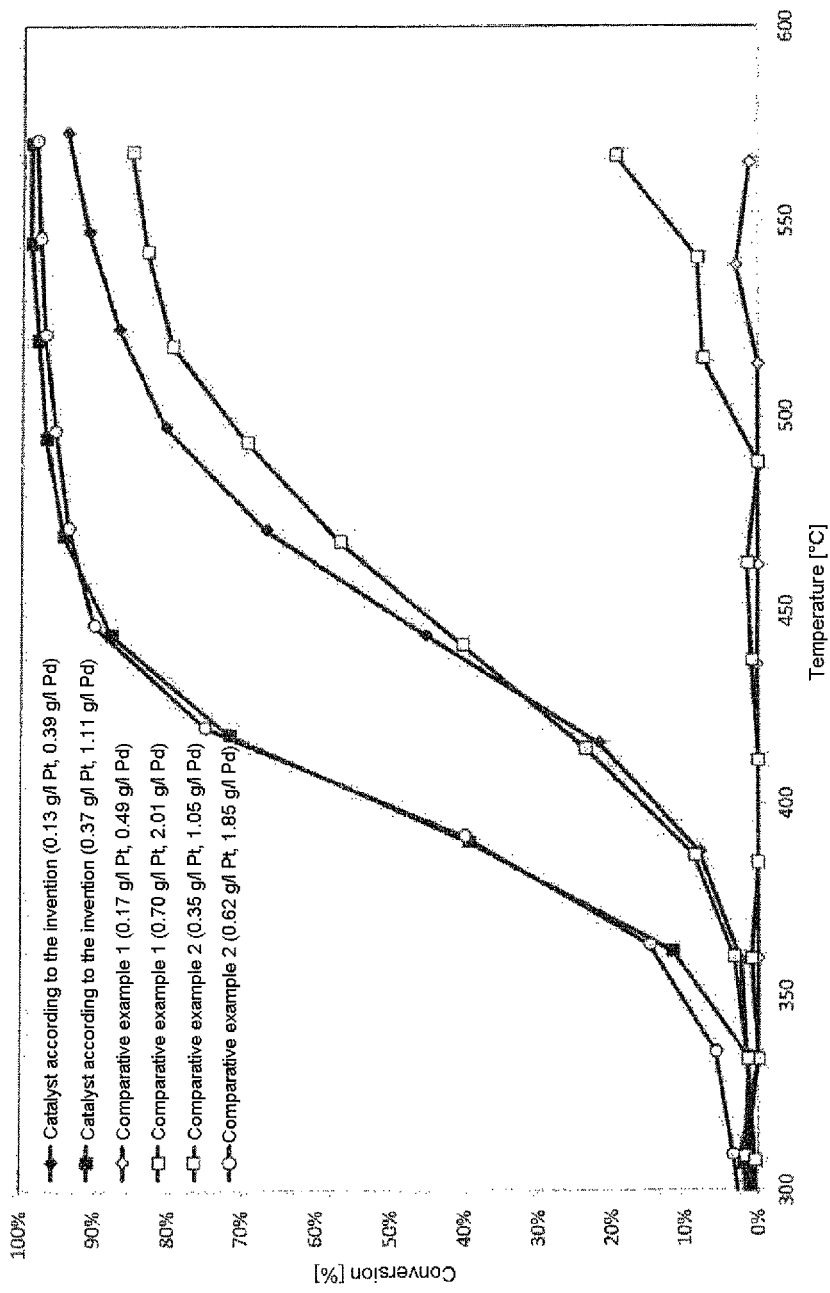
FIGS. 4a, 4b: show performance data in the oxidation of alkanes (methane, ethane) of the PtPd-BEA150 zeolite according to the invention, and also of comparative examples 1 and 2, in each case with different precious metal chargings in the fresh state.
Figure 4B:
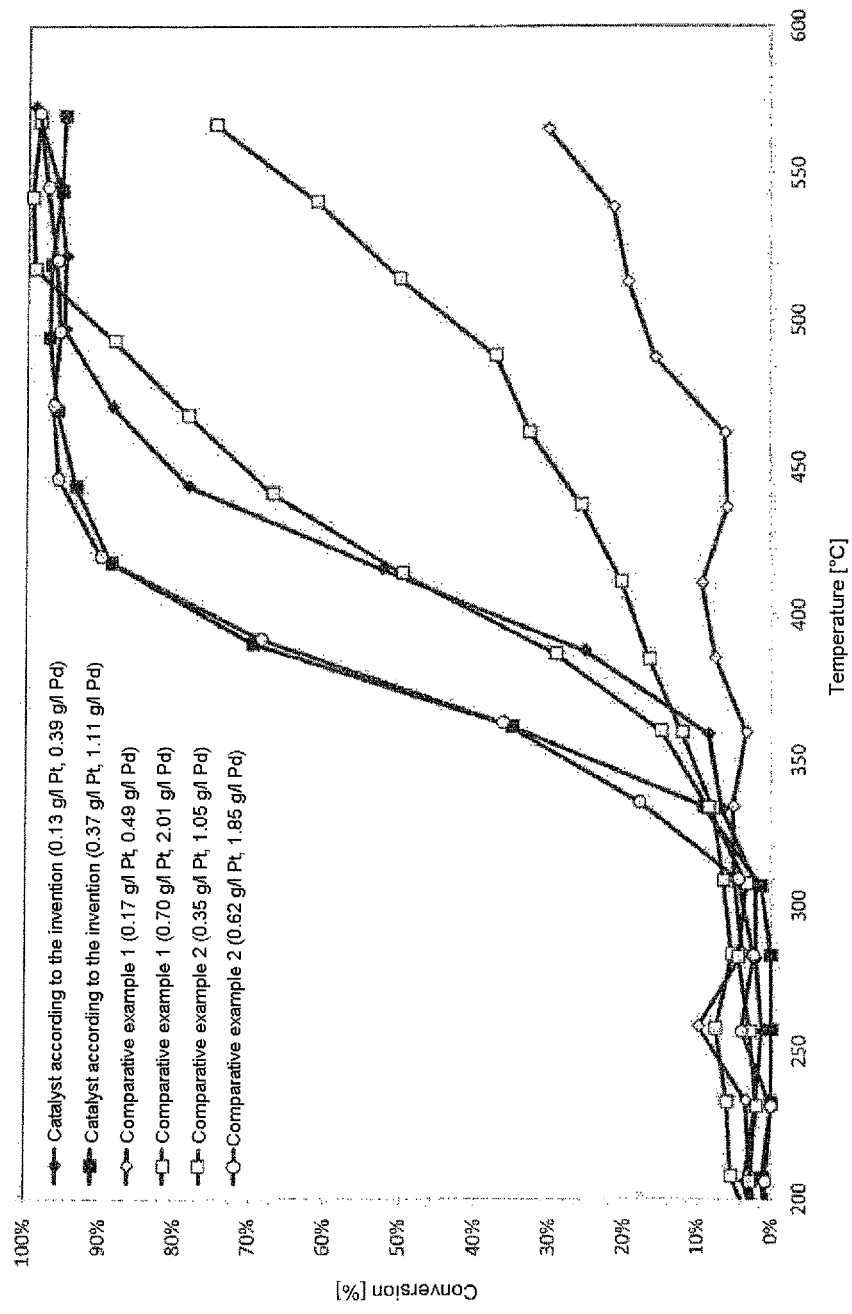
Figure 5A:
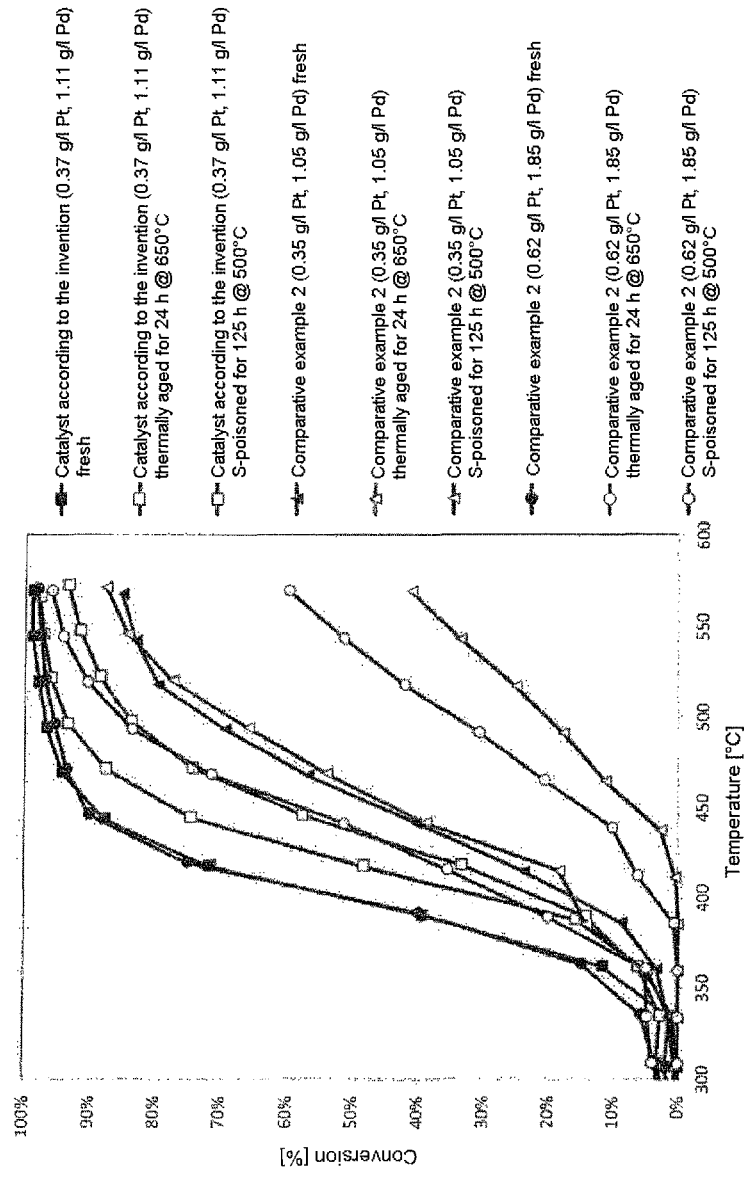
FIGS. 5a, 5b: show performance data in the oxidation of alkanes (methane, ethane) of the PtPd-BEA150 zeolite according to the invention, and also of comparative example 2 with different precious metal chargings in the fresh state, following thermal aging and after poisoning with $SO_2$.
Figure 5B:
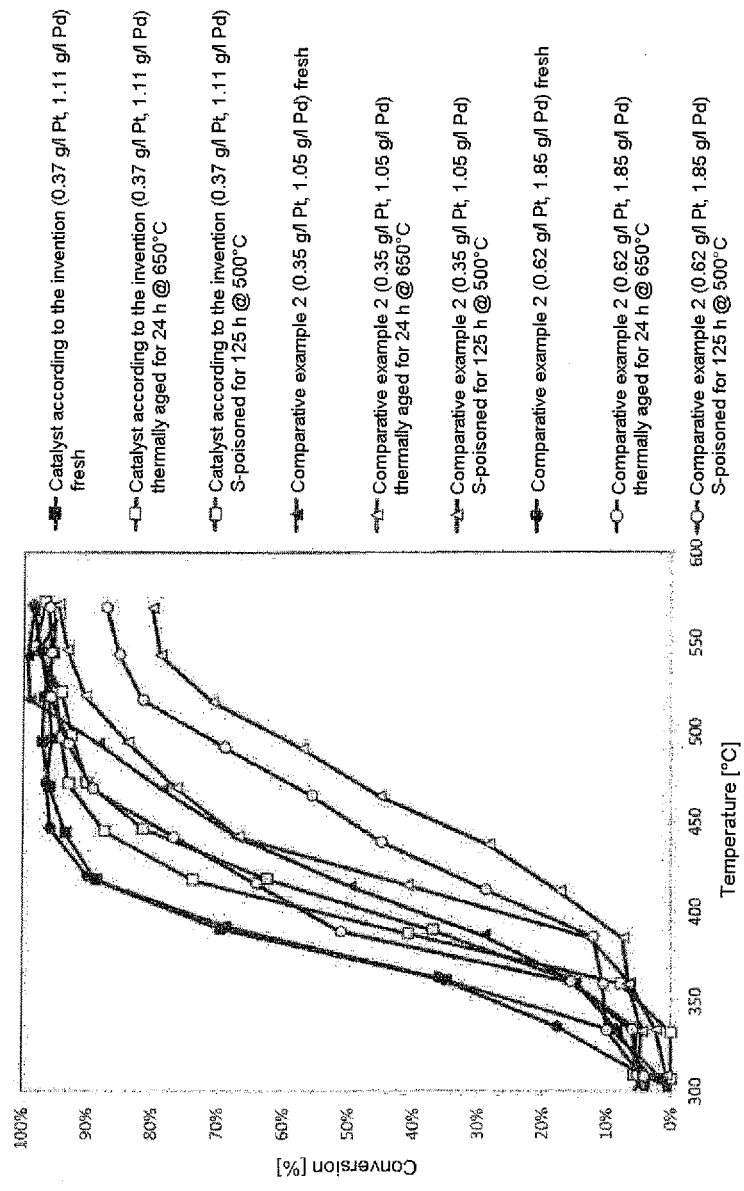

FIGS. 2 and 3 show the IR spectra of the PtPd-BEA150 zeolite according to the invention, as well as of comparative example 1 following CO chemisorption with and without the metered addition of adamantanecarbonitrile. Measuring IR spectra after CO chemisorption is a widespread technique for investigating the nature and dispersion of precious metal species in precious-metal-containing catalysts. CO can here achieve precious metal species both on the inside and outside of the pores and interact with them and, in so doing, generate signals that can be evaluated by means of IR spectroscopy.

Nitriles such as adamantanecarbonitrile enter into a greater interaction with precious metal species and are therefore preferentially adsorbed by these. It is therefore possible to mask precious metal species for the CO chemisorption with the help of nitriles. Nitrile molecules with diameters greater than or equal to the pores of the zeolites are unable to penetrate into zeolite pores and therefore selectively mask precious metal species on the outside of the pores. Adamantanecarbonitrile has a molecular diameter >0.6 nm. This is comparable to the diameters of the pore openings of the BEA zeolite (0.56-0.7 nm), and consequently adamantanecarbonitrile can be used in order to mask precious metal species on the outside of the zeolite pores in a selective manner for the CO chemisorption. The IR absorption bands of adamantanecarbonitrile itself do not interfere here with the IR absorption bands of the CO chemisorption on precious metal species.

For the IR investigations described below, samples of the PtPd-BEA150 zeolite according to the invention and of comparative sample 1 were firstly degassed at $10^{-6}$ mbar for 3 hours at 400° C. and then reduced with nitrogen for 30 min in the IR measuring cell. The samples were then supplied with 20 mbar of CO and a first IR spectrum was recorded. The CO was then further removed by gassing at 400° C. under vacuum for 30-60 min. After cooling, adamantanecarbonitrile vapor was dosed onto the samples in order to mask the precious metal species on the outside of the zeolite pores, followed by a further supplying with 20 mbar of CO. The second IR spectrum was then recorded. The difference between the two IR spectra shows the precious metal species which are located on the outside of the zeolite pores and can therefore be masked by adamantanecarbonitrile vapor. All the spectra themselves were recorded using a thermo 4700 FTIR spectrometer with a resolution of 4 cm$^{-1}$.

FIG. 2 shows the IR spectra of the CO chemisorption of the Pt-Pd-BEA150 zeolite according to the invention, FIG. 3 shows that of comparative example 1, in each case before and after selective masking of the precious metal species on the outside of the zeolite pores with adamantanecarbonitrile. Firstly to be noted are for both samples the two main bands around 2000 cm$^{-1}$ (assignable to Pd) and 2100 cm$^{-1}$ (assignable to Pt). Both bands are attenuated by the adamantanecarbonitrile addition, the attenuation in the case of the Pt-Pd-BEA150 zeolite according to the invention being less marked than in the case of comparative example 1. This means there are more precious metal species in the zeolite pores in the Pt-Pd-BEA150 zeolite according to the invention than in comparative example 1. Furthermore, in the case of comparative example 1, at 1900 cm$^{-1}$ there is an absorption band that can be masked virtually completely by adamantanecarbonitrile addition and which is not present in the Pt-Pd-BEA150 zeolite according to the invention.

Also in the case of more highly charged ("supercharged") PtPd-BEA150/Ar zeolites, the 1900 cm$^{-1}$ band can arise, for example at 1.13% Pt and 3.4% Pd, but not at 0.92% Pt/2.8% Pd. However, the former material exhibits a considerably lower performance in the alkane oxidation.

Table 2 shows the catalyst sample produced therefrom (including comparison sample). FIGS. 4a-c and 5a, 5b summarize the performance data obtained, measured in the simultaneous oxidation of 800 ppmv CO, 1000 ppmv methane, 360 ppmv ethane, 200 ppmv ethylene and 180 ppmv propane in a carrier gas consisting of 10% oxygen and 3% water in nitrogen. The measurements were carried out at a GHSV of 40 000 h$^{-1}$. The catalyst samples were then tested again in the oxidation of 200 ppmv ethyl acetate in air at a GHSV of 40 000 h$^{-1}$. The aging was carried out with the samples of the fresh test, these were treated for 24 h at 650° C. in a muffle furnace and then tested again. For the thionation, fresh samples were exposed to a mixture of 100 ppm SO$_2$, 250 ppm C$_3$H$_8$ and 5% H$_2$O in air for 125 h at 500° C. The activity loss of EnviCat 50300 in the alkane oxidation is typically about 60-75% under these conditions.

TABLE 2

Produced PtPd-BEA150 zeolite catalyst samples (step 2) and comparison samples

| | Honeycomb number | Pt [% by weight] | Pd [% by weight] |
|---|---|---|---|
| PtPd-BEA150 - formulation according to the invention and catalyst | 1 | 0.13 | 0.39 |
| | 2 | 0.37 | 1.11 |
| PtPd-BEA150 - comparative example 1 | 1 | 0.17 | 0.49 |
| | 2 | 0.70 | 2.1 |
| Comparative example 2 (EnviCat 50300) | 1 | 0.35 | 1.05 |
| | 2 | 0.62 | 1.85 |

Figure 6A:
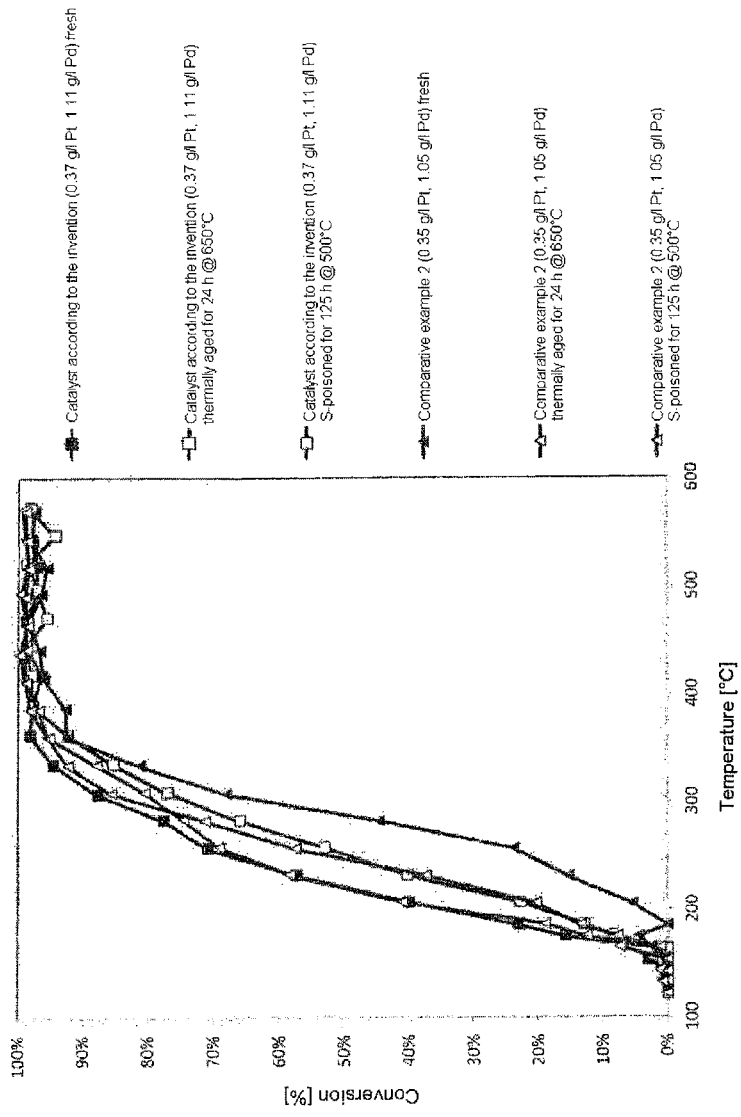
FIGS. 6a, 6b: show performance data in the oxidation of ethylene and ethyl acetate of the PtPd-BEA150 zeolite according to the invention, and also of comparative example 2, in each case fresh, following thermal aging and after poisoning with $SO_2$.
Figure 6B:
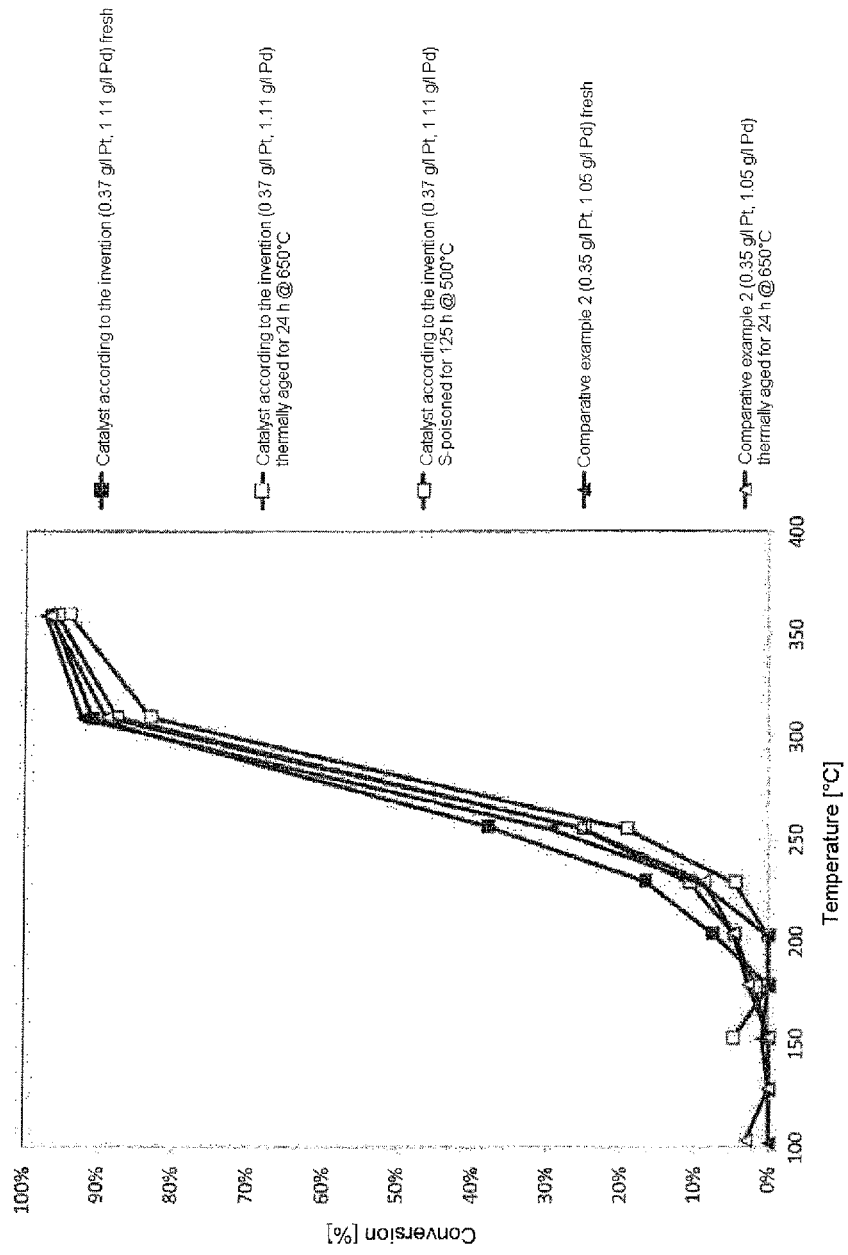

The data shown in FIGS. 4a, 4b and 5a, 5b show that the catalyst honeycombs based on the formulation according to the invention have a performance in the alkane oxidation that is considerably increased compared to comparative example 2 (Envicat 50300), with a comparable conversion level being achieved in the case of the formulation according to the invention with only half of the precious metal content compared to Envicat 50300. This is true for fresh, aged and sulfur-poisoned catalyst samples. Comparative example 1, by contrast, exhibits barely any significant activity. As can be seen in FIGS. 6a and 6b, the advantages of the catalysts according to the invention are also given in the oxidation of ethyl acetate. In the case of the oxidation of ethylene, catalysts according to the invention and comparison catalysts exhibit an approximately identical performance.

The invention claimed is:

1. A method for producing a bimetallic catalyst comprising the steps of:
    a) impregnating a zeolitic support material with sulfur-free Pt and Pd precursor compounds, wherein the Pt and Pd precursor compounds are solutions of nitrates,
    b) drying the impregnated zeolitic support material in air, and
    c) calcinating the impregnated and dried zeolitic support material under protective gas, wherein the zeolitic support material has a structure type of BEA and wherein the structure type corresponds to the IUPAC Commission of Zeolite Nomenclature.

2. The method as claimed in claim 1, wherein the calcinating step takes place at temperatures from 350 to 650° C.

3. The method as claimed in claim 1, wherein the drying of the impregnated zeolitic support material takes place below the decomposition point of the Pt and Pd precursor compounds.

4. The method as claimed in claim 1, comprising the further steps:
    d) producing a washcoat from the impregnated and calcined zeolitic support material,
    e) coating a support body with the washcoat, and
    f) drying and calcinating the coated support body in air.

5. The method as claimed in claim 4, wherein the calcinating step takes place at temperatures from 300 to 600° C.

6. A catalyst comprising a bimetallic catalytically active composition comprising Pt and Pd on a zeolitic support material made by a method comprising the steps of:
    a) impregnating a zeolitic support material with sulfur-free Pt and Pd precursor compounds, wherein the Pt and Pd precursor compounds are solutions of nitrates,
    b) drying the impregnated zeolitic support material in air, and
    c) calcinating the impregnated and dried zeolitic support material under protective gas, wherein the zeolitic support material has a structure type of BEA and wherein the structure type corresponds to the IUPAC Commission of Zeolite Nomenclature.

7. The catalyst as claimed in claim 6, wherein the bimetallic catalytically active composition has a BET surface area of more than 400 m²/g.

8. The catalyst as claimed in claim 6, wherein the bimetallic catalytically active composition has a Pt content of 0.2 to 1.5% by weight, based on the catalytically active composition.

9. The catalyst as claimed in claim 6, wherein the bimetallic catalytically active composition has a Pd content of 0.8 to 4.0% by weight, based on the catalytically active composition.

10. The catalyst as claimed in claim 6, wherein the catalytically active composition is applied as a washcoat coating to a support body.

11. The catalyst as claimed in claim 10, wherein the catalyst has 0.5 to 3% by weight of Pt based on the coated washcoat.

12. The catalyst as claimed in claim 10 where the catalyst has 1 to 5% by weight of Pd based on the coated washcoat.

13. The catalyst as claimed in claim 10 wherein the bimetallic catalytically active composition or the washcoat coating has a Pd/Pt weight ratio of 6:1 to 1:1.

14. The catalyst as claimed in claim 6, wherein the Pt and Pd is located essentially in the pores of the zeolitic support material.

15. The catalyst as claimed in claim 6, wherein the Pt and Pd is present in aggregates of <5 nm.

16. An oxidation catalyst comprising a catalyst as claimed in claim 6.

17. A method for producing a bimetallic catalyst comprising the steps of:
a) impregnating a zeolitic support material with sulfur-free Pt and Pd precursor compounds, wherein the Pt and Pd precursor compounds are solutions of nitrates,
b) drying the impregnated zeolitic support material in air,
c) calcinating the impregnated and dried zeolitic support material under protective gas,
d) producing a washcoat from the impregnated and calcined zeolitic support material,
e) coating a support body with the washcoat, and
f) drying and calcinating the coated support body in air, wherein the calcinating step takes place at temperatures from 300 to 600° C. and wherein the zeolitic support material has a structure type of BEA and wherein the structure type corresponds to the IUPAC Commission of Zeolite Nomenclature.

18. A method for producing a bimetallic catalyst comprising the steps of
a) impregnating a zeolitic support material with sulfur-free Pt and Pd precursor compounds, wherein the Pt and Pd precursor compounds are solutions of nitrates,
b) drying the impregnated zeolitic support materia in air,
c) calcinating the impregnated and dried zeolitic support material under protective gas,
d) producing a washcoat from the impregnated and calcined zeolitic support material and a silicatic binder,
e) coating a support body with the washcoat, and
f) drying and calcinating the coated support body in air, wherein the calcinating step takes place at temperatures from 300 to 600° C. and wherein the zeolitic support material has a structure type selected from the group consisting of BEA and MFI, and wherein the structure type corresponds to the IUPAC Commission of Zeolite Nomenclature.

19. A catalyst comprising a bimetallic catalytically active composition comprising Pt and Pd on a zeolitic support material made by a method comprising the steps of:
a) impregnating a zeolitic support material with sulfur-free Pt and Pd precursor compounds, wherein the Pt and Pd precursor compounds are solutions of nitrates,
b) drying the impregnated zeolitic support material in air,
c) calcinating the impregnated and dried zeolitic support material under protective gas,
d) producing, a washcoat from the impregnated and calcined zeolitic support material and a silicatic binder,
e) coating a support body with the washcoat, and
f) drying and calcinating the coated support body in air, wherein the calcinating step takes place at temperatures from 300 to 600° C. and wherein the zeolitic support material has a structure type selected from the group consisting of BEA and MFI, and wherein the structure type corresponds to the IUPAC Commission of Zeolite Nomenclature.

* * * * *